(12) United States Patent
Lambert

(10) Patent No.: US 10,349,364 B1
(45) Date of Patent: Jul. 9, 2019

(54) SYSTEM AND METHOD FOR PROVIDING COMMUNICATION COEXISTENCE AMONG DIFFERENT RADIO TECHNOLOGIES VIA SYNCHRONIZATION AND TIME SLOT ALLOCATION

(71) Applicant: MARVELL INTERNATIONAL LTD., Hamilton (BM)

(72) Inventor: Paul A. Lambert, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 322 days.

(21) Appl. No.: 15/013,002

(22) Filed: Feb. 2, 2016

Related U.S. Application Data

(60) Provisional application No. 62/113,773, filed on Feb. 9, 2015.

(51) Int. Cl.
*H04W 56/00* (2009.01)
*H04W 72/04* (2009.01)
*H04W 84/12* (2009.01)

(52) U.S. Cl.
CPC ....... *H04W 56/00* (2013.01); *H04W 72/0446* (2013.01); *H04W 84/12* (2013.01)

(58) Field of Classification Search
CPC .................................................. H04W 16/14
See application file for complete search history.

(56) References Cited

U.S. PATENT DOCUMENTS

| | | | |
|---|---|---|---|
| 2013/0170505 A1* | 7/2013 | Nemeth | H04L 12/407 370/442 |
| 2016/0100400 A1* | 4/2016 | Lu | H04W 84/12 370/336 |
| 2016/0157193 A1* | 6/2016 | Qi | H04W 56/00 370/350 |

\* cited by examiner

*Primary Examiner* — Kevin M Cunningham

(57) ABSTRACT

Apparatus, methods, and other embodiments associated with the coexistence of multiple radio devices in a same environment are described. According to one embodiment, a non-transitory computer-readable medium storing computer-executable instructions includes instructions for transmitting and receiving radio signals in accordance with at least one wireless communication technology. The instructions also include instructions for discovering a plurality of radio devices operating within a same radio band within a same geographic region. At least one radio device of the plurality of radio devices operates based on at least two different wireless communication technologies. The instructions further include instructions for generating a master clock reference and temporally synchronizing the plurality of radio devices with respect to the master clock reference.

23 Claims, 6 Drawing Sheets

SYSTEM AND METHOD FOR PROVIDING COMMUNICATION COEXISTENCE AMONG DIFFERENT RADIO TECHNOLOGIES VIA SYNCHRONIZATION AND TIME SLOT ALLOCATION

CROSS REFERENCE TO RELATED APPLICATIONS

This patent disclosure claims the benefit of U.S. Provisional Application Ser. No. 62/113,773 filed on Feb. 9, 2015, which is hereby wholly incorporated by reference.

BACKGROUND

Wireless devices using different types of radio technology (e.g., Wi-Fi, Bluetooth, Long Term Evolution, etc.) and operating in the same frequency band can interfere with each other. Various solutions have been attempted, with various levels of success, to allow such devices to co-exist in the same environment without interference. For example, some solutions for coexistence allow a wireless station device to block all nearby Wi-Fi communications to allow the station device to listen for Bluetooth transmissions (e.g., CTS2self). However, multiple station devices will block different time regions and greatly decrease overall Wi-Fi throughput. Furthermore, proposals to use 802.11v Unscheduled Automatic Power Save Delivery (U-APSD) may work for a single access point device, but will not work well when there are multiple access point devices in a region.

SUMMARY

In general, in one aspect this specification discloses a first radio device including communication logic configured to transmit and receive radio signals in accordance with at least one wireless communication technology. The first radio device also includes discovery logic configured to, in cooperation with the communication logic, discover a plurality of radio devices operating within a same radio band within a same geographic region. The plurality of radio devices includes the first radio device. At least one radio device of the plurality of radio devices operates based on at least two different wireless communication technologies. The first radio device further includes synchronization logic configured to, in cooperation with the communication logic, temporally synchronize the plurality of radio devices with respect to a master clock reference generated by one of the plurality of radio devices. The first radio device also includes time slot allocation logic configured to, in cooperation with the communication logic, allocate at least one transmission time slot of a plurality of transmission time slots to at least one radio device of the plurality of radio devices based on discovering and synchronizing the plurality of radio devices. Allocating the at least one transmission time slot ensures that radio transmissions by the at least one radio device do not occur at the same time as radio transmissions by other radio devices of the plurality of radio devices.

In general, in another aspect, this specification discloses a method that is performable by a first radio device. The method includes discovering a plurality of radio devices operating within a same radio band within a same geographic region. The plurality of radio devices includes the first radio device. Furthermore, at least one radio device of the plurality of radio devices operates based on at least two different wireless communication technologies. The method also includes temporally synchronizing the plurality of radio devices with respect to a master clock reference generated by one of the plurality of radio devices. The method further includes allocating at least one transmission time slot of a plurality of transmission time slots to at least one radio device of the plurality of radio devices based on the discovering and the synchronizing. The allocating of the at least one transmission time slot ensures that radio transmissions by the at least one radio device do not occur at a same time as radio transmissions by other radio devices of the plurality of radio devices.

In general, in another aspect, this specification discloses an integrated circuit device. In one embodiment, the integrated circuit device includes communication logic configured to transmit and receive radio signals in accordance with at least one wireless communication technology. The integrated circuit device also includes discovery logic configured to, in cooperation with the communication logic, discover a plurality of radio devices operating within a same radio band within a same geographic region. The plurality of radio devices includes the integrated circuit device. Furthermore, at least one radio device of the plurality of radio devices operates based on at least two different wireless communication technologies. The integrated circuit device further includes synchronization logic configured to generate a master clock reference and, in cooperation with the communication logic, temporally synchronize the plurality of radio devices with respect to the master clock reference.

In general, in another aspect, this specification discloses a non-transitory computer-readable medium storing instructions that, when executed by one or more processors of a computing device, cause the computing device to perform functions. The instructions include instructions for transmitting and receiving radio signals in accordance with at least one wireless communication technology. The instructions also include instructions for discovering a plurality of radio devices operating within a same radio band within a same geographic region, wherein at least one radio device of the plurality of radio devices operates based on at least two different wireless communication technologies. The instructions also include instructions for generating a master clock reference and temporally synchronizing the plurality of radio devices with respect to the master clock reference.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
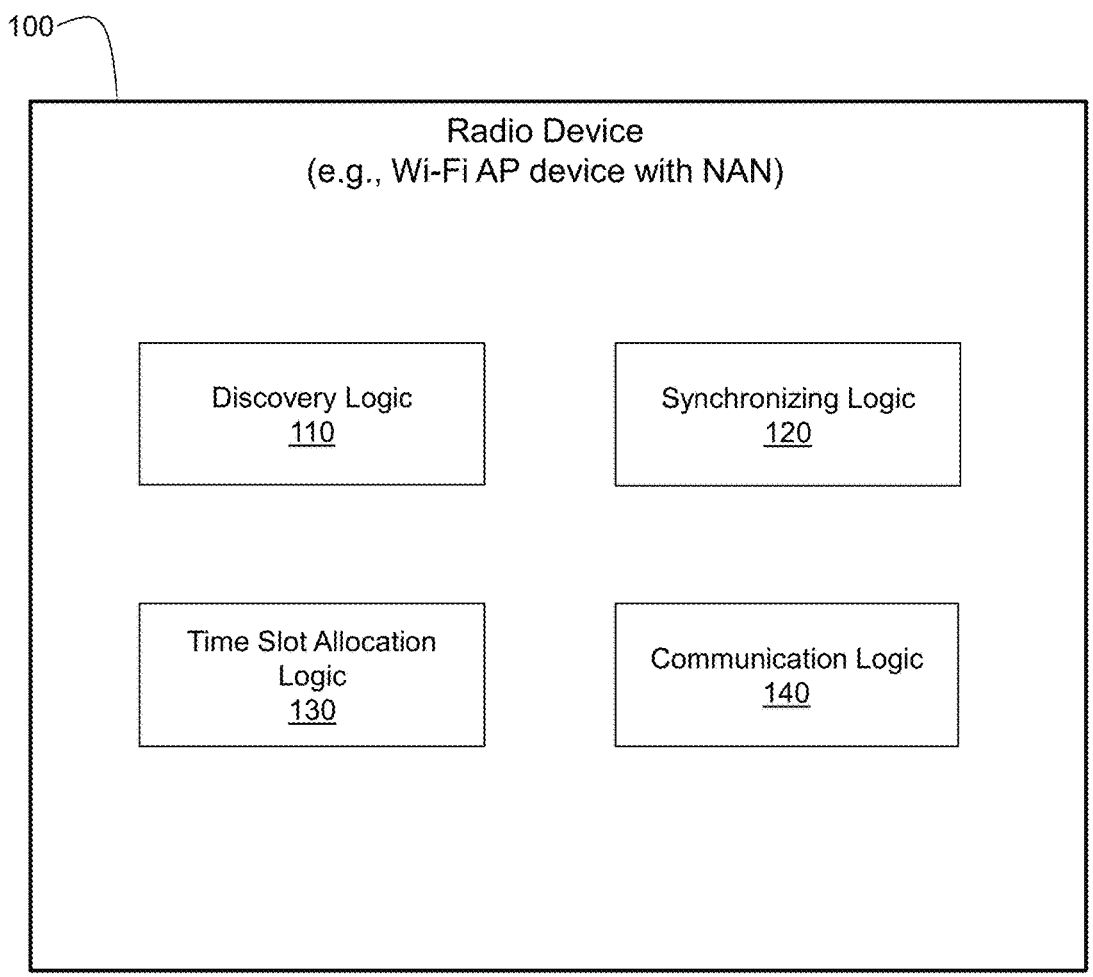
FIG. 1 illustrates a first example embodiment of a radio device configured to support the coexistence of multiple radio devices that use multiple wireless communication technologies in a same radio frequency band in a same region.

Described herein are examples of systems, devices, methods, and other embodiments associated with providing a mechanism to allow multiple radio devices, which use multiple wireless communication technologies in a same radio frequency band, to coexist in a same regional environment without interfering with each other. The various multiple wireless communication technologies may include any of, for example, Wi-Fi, Bluetooth, Long-Term Evolution (LTE), Long-Term Evolution Unlicensed (LTE-U), and Licensed Assisted Access (LAA). Other wireless communication technologies are possible as well.

In one embodiment, one of the radio devices generates a master clock reference, discovers the presence of other nearby radio devices, synchronizes the radio devices to the master clock reference, and allocates transmission time slots to all of the radio devices such that the radio devices transmit at different times. Throughout the description, a "transmission time slot" may simply be referred to as a "time slot". The radio device may be, for example, a Wi-Fi access point (AP) device configured with neighbor awareness networking (NAN) technology which provides techniques to synchronize all discovered radio devices to the same time synchronization function (TSF).

However, instead of becoming aware of (discovering) only other Wi-Fi devices within a region, the Wi-Fi access point device is capable of becoming aware of radio devices within the region that communicate using other communication technologies as well. Various techniques may be employed by the AP device to discover, synchronize, and allocate time slots to other radio devices operating within a same radio frequency band within a particular region. Such techniques may include, for example, a central coordinating model technique, a distributed model technique, or a sharing model technique as discussed later herein.

By being aware of all wireless communication technologies operating within a same radio frequency band in a particular region, the potential for radio devices to interfere with each other by transmitting at the same time can be greatly reduced. Synchronizing all known radio devices in a region to a same master clock reference allows for the allocating of time slots among the various radio devices. As a new radio device begins operating within the region, or as a current radio device ceases operation within the region, the time slots can be re-allocated to accommodate the new mix of radio devices.

The term "radio device", as used herein, refers to any device that is configured to transmit and receive radio frequency signals using one or more wireless communication technologies. For example, radio devices may include access point devices and station devices in one or more computer communication networks. Radio devices may include wireless network routers, mobile cellular telephone devices, mobile laptop devices, mobile tablet devices, mobile phablet devices, as well as fixed desktop computers and server computers, for example.

The term "wireless communication technology", as used herein, refers to a technology that supports a wireless communication protocol such as, for example, Wi-Fi, Bluetooth, LTE, LTE-U, and LAA.

The term "wireless access point" or "access point (AP)" or "access point device", as used herein with respect to computer networking, refers to a device that allows wireless radio devices to connect to a wired network using Wi-Fi, or related standards.

The term "master clock reference", as used herein, refers to an internal timing signal (e.g., a time synchronization function) generated by a radio device (e.g., by an AP device) that is used to define a time reference to which multiple radio devices may be synchronized. For example, a master clock reference may define the times of transmission of a periodic beacon signal (e.g., a discovery window) from a radio device. Furthermore, periodic transmission time slots may be defined to occur at specific times between transmitted beacon signals. Another radio device may be synchronized to the master clock reference by receiving synchronization information in the form of a beacon signal, or a synchronizing message defining a time of transmission, for example.

The term "synchronizing information" or "synchronizing message", as used herein, refers to information that specifies the details of when and how a transmission will take place by a radio device with respect to other radio devices within a same frequency band and a same geographic region. For example, synchronizing information may include a master start time (e.g., corresponding to a transmission time of a beacon signal), an offset time, and a transmission time duration for a radio device. In this manner, a transmission time slot is specified for a radio device such that the radio device can "know" to start transmitting at a particular time, which is offset from the master start time, for no longer than the specified time duration. The synchronizing information may also include operating class/channel information indicating a band mode and communication channel on which transmission is to occur by a radio device. Furthermore, the synchronizing information may include a media access control (MAC) address of the radio device. The synchronizing information may be dictated by a controlling radio device operating within a particular frequency band within a particular geographic region, in accordance with one embodiment.

The term "beacon frame" or "beacon message" or "beacon", as used herein refers to one of the management frames in a computer network that is based on a wireless communication standard (e.g., IEEE 802.11). A beacon frame contains information about the computer network and is transmitted periodically (e.g., by access points) to announce the presence of the wireless network. Beacon frames may include synchronizing information, as described herein.

The term "management frame" or "broadcast management message" or "management message", as used herein, refers to data frames transmitted and received by network devices in a computer network that allow for the maintenance of communication. Some common IEEE 802.11 management frames include a beacon frame, an authentication frame, an association request frame, an association response frame, a deauthentication frame, a disassociation frame, a probe request frame, a probe response frame, a reassociation request frame, and a reassociation response frame.

The term "association" or "network association", as used herein, refers to a cooperative relationship that is formed, which is supported by the exchange of protocol control information, for the purpose of exchanging data (e.g., exchanging large volumes of data at high speed) between two devices on a computer network. For example, a wireless mobile device may form a network association with an access point in a computer network to gain access to the internet. When an association request frame is sent from a wireless mobile device to an access point, it enables the access point to allocate resources and synchronize. The frame may carry information about a wireless network interface controller, including supported data rates and the service set identifier (SSID) of the computer network the wireless mobile device wishes to associate with. If the request is accepted, the access point can reserve memory and establish an association identification (ID) for the wireless network interface controller.

FIG. 1 illustrates a first example embodiment of a radio device 100 configured to support the coexistence of multiple radio devices that use multiple wireless communication technologies in a same radio frequency band in a same region. The radio device includes, but is not limited to, discovery logic 110, synchronizing logic 120, time slot allocation logic 130, and communication logic 140, each of which can be implemented in a memory with stored instructions, firmware, hardware, or any combination thereof. In one embodiment, the radio device 100 is a station device (e.g., a wireless mobile device) capable of connecting to a wireless computer network (e.g., via a Wi-Fi access point). In another embodiment, the radio device is a wireless access point. In one embodiment, the radio device 100 is configured with a neighbor awareness networking (NAN) capability (e.g., in accordance with a Wi-Fi neighbor awareness networking technical specification).

Figure 5:
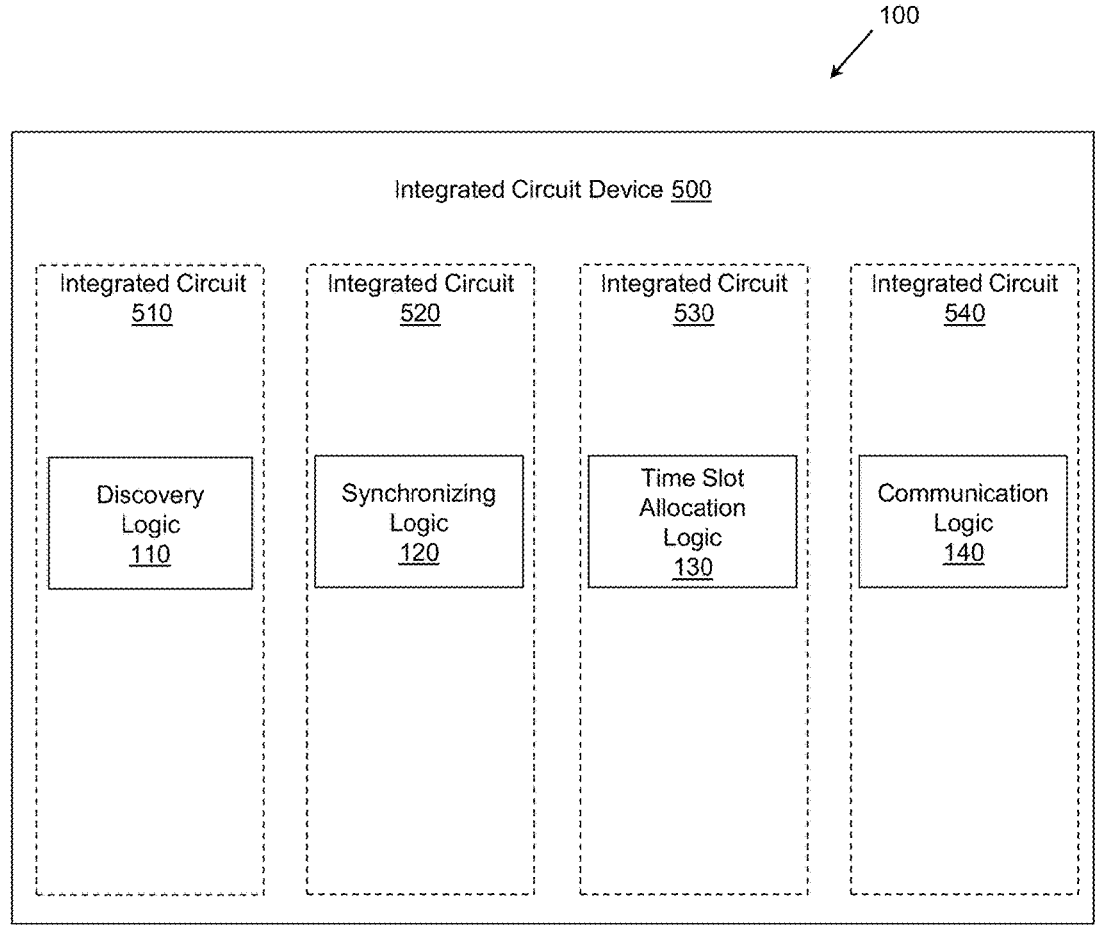
FIG. 5 illustrates one example embodiment of the radio device of FIG. 1 implemented as an integrated circuit device.

In one embodiment, the radio device 100 is implemented on a chip (i.e., a system-on-chip or SOC configuration) including one or more integrated circuits configured to perform one or more of the functions described herein (see FIG. 5). In another embodiment, portions of the logics of the radio device 100 may be part of an executable algorithm configured to perform the functions of the portions of the logics, where the algorithm is stored in a non-transitory medium. For example, in one embodiment, the logics of FIG. 1 form an executable application including algorithms and/or program modules configured to perform the functions of the logics. The application is stored in a non-transitory computer storage medium. That is, in one embodiment, the various logics of the radio device 100 are implemented as modules of instructions stored on a computer-readable medium.

Referring to FIG. 1, communication logic 140 is configured to transmit and receive radio signals in accordance with at least one wireless communication technology. For example, communication logic 140 may be configured to support one or more of Wi-Fi, Bluetooth, Long-Term Evolution, Long-Term Evolution Unlicensed, and Licensed Assisted Access wireless communication technologies. Support of other communication technologies is possible as well, in accordance with other embodiments. However, each communication technology may operate in a same radio frequency band (e.g., a radio frequency band defined from 2.4 GHz to 2.4835 GHz which is a common radio frequency band for Wi-Fi and Bluetooth devices). Communication logic 140 includes transmitter circuitry Tx 612, receiver circuitry Rx 614, and an antenna 650 for transmitting and receiving signals, in accordance with one embodiment (e.g., see FIG. 6).

Figure 2:
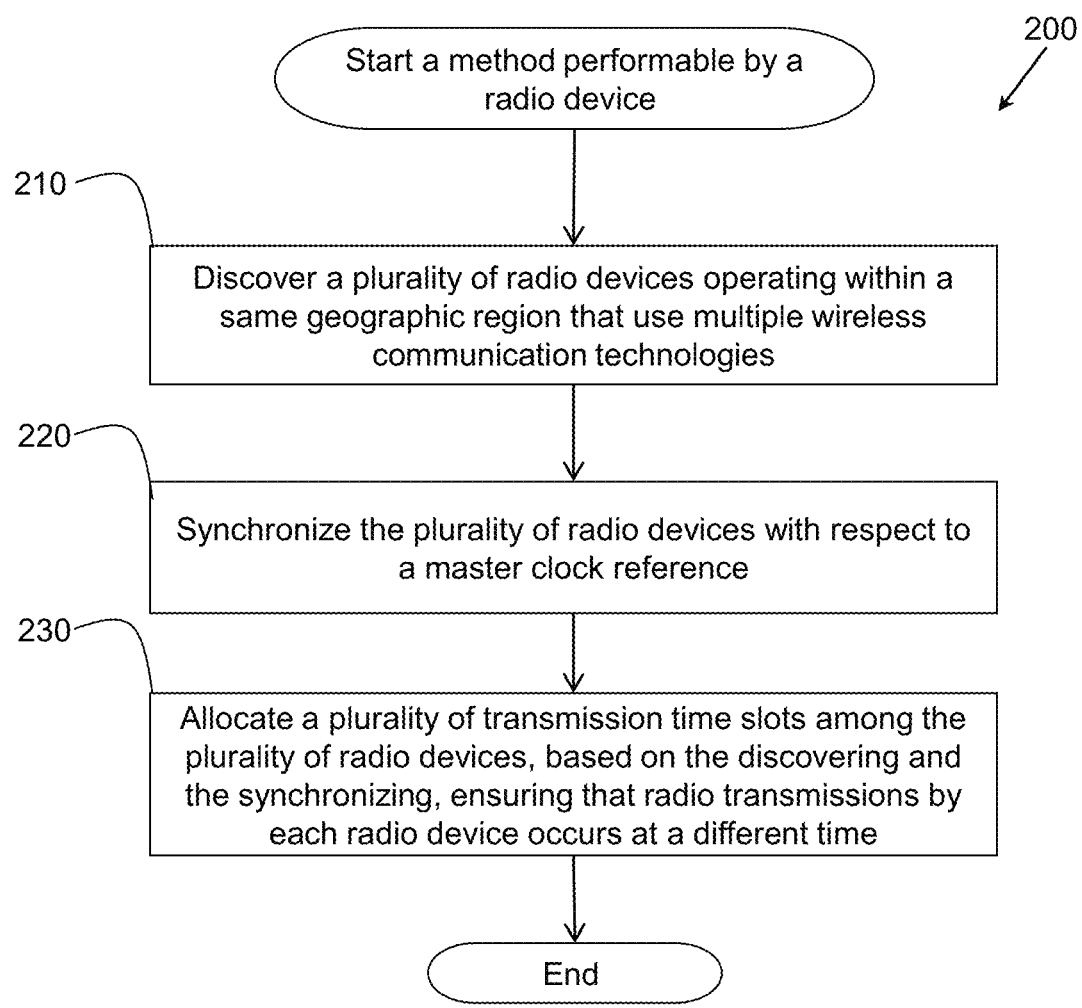
FIG. 2 illustrates an example embodiment of a method, performed by the radio device of FIG. 1, for supporting the coexistence of multiple radio devices that use multiple wireless communication technologies in a same radio frequency band in a same region.

FIG. 2 illustrates an example embodiment of a method 200, performed by the radio device 100 of FIG. 1, for supporting the coexistence of multiple radio devices that use multiple wireless communication technologies in a same radio frequency band in a same region. Method 200 is implemented to be performed by the radio device 100 of FIG. 1, or by a computing device (e.g., an integrated circuit device) configured with an algorithm of method 200. Method 200 will be described from the perspective that the radio device (or the computing device) is a network device (e.g., a station device or an access point device) operable to connect, via an operable connection, to a wireless computer network.

Method 200 starts when the radio device 100 attempts to discover other radio devices on a wireless computer network. The other radio devices can be discovered directly, or indirectly through an intermediate device (a cross-over device). The wireless computer network may include access point devices and non-access point devices, for example. In one embodiment, one of the access point devices is the radio device 100 which is responsible for and/or dedicated to discovering, synchronizing, and allocating transmission time slots with respect to the other radio devices. Other access point devices of the other radio devices may be configured to allow wireless devices to connect to a wired network using Wi-H, or related standards.

Figure 3:
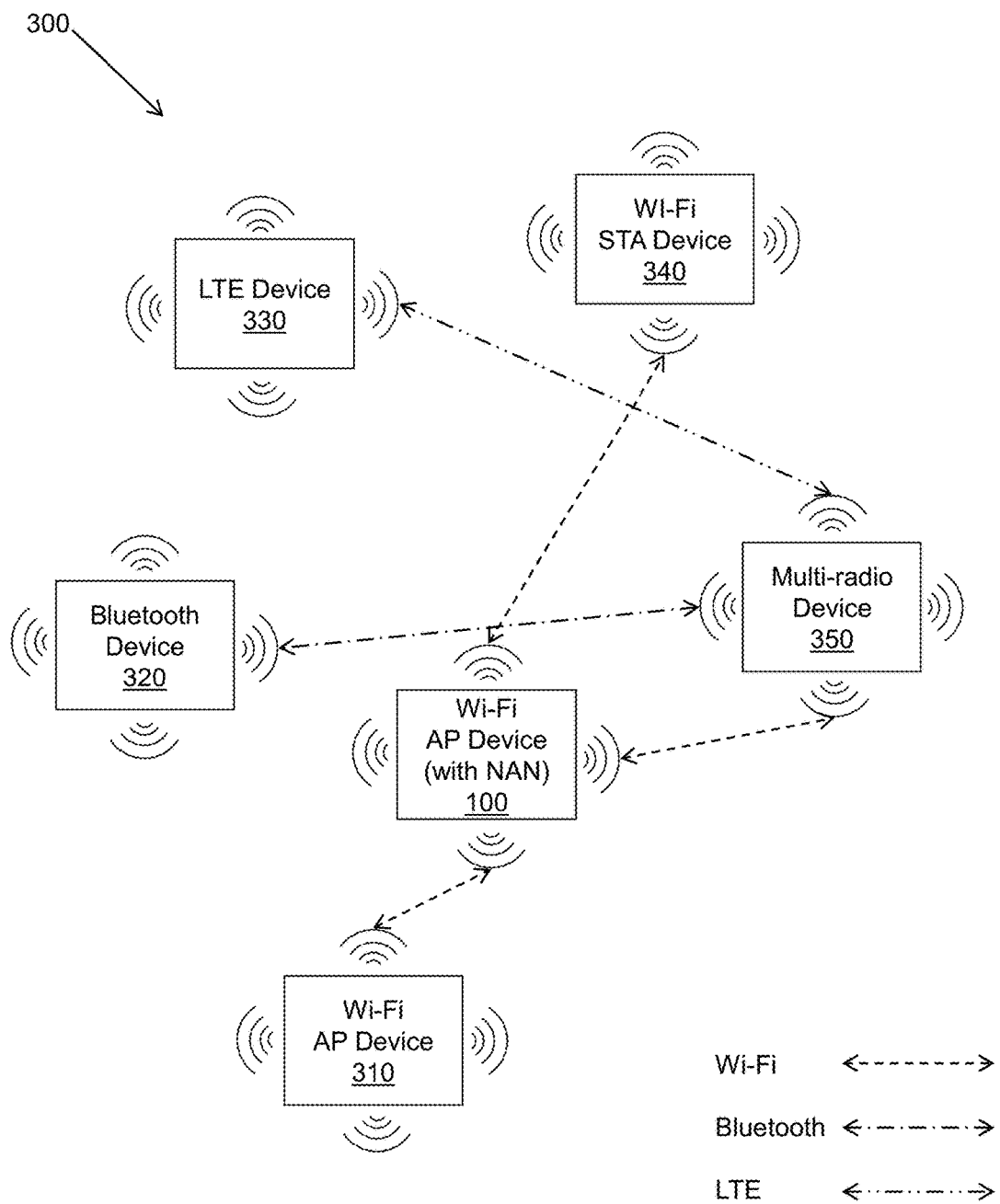
FIG. 3 illustrates an example embodiment of a communication environment having multiple radio devices communicating using multiple wireless communication technologies.

At 210, the radio device 100 discovers multiple radio devices operating within a same radio frequency band within a same geographic region. Again, the multiple radio devices can be discovered directly, or indirectly through an intermediate device (a cross-over device) as discussed herein. Multiple wireless communication technologies are used across the multiple radio devices. FIG. 3 illustrates an example embodiment of a communication environment 300 (e.g., a wireless computer network) having multiple radio devices communicating using multiple wireless communication technologies. The environment 300 represents multiple radio devices operating within a same radio frequency band (e.g., a 2.4 GHz band) within a same geographic region.

The environment 300 of FIG. 3 includes the radio device 100 from FIG. 1. In FIG. 3, the radio device 100 is configured as a Wi-Fi AP device with NAN capability. The environment 300 of FIG. 3 also includes another Wi-Fi AP device 310, a Bluetooth device 320, an LTE device 330, a Wi-Fi station device 340, and a multi-radio device 350 (e.g., Wi-Fi, Bluetooth, and LTE). Multi-radio device 350 acts as a cross-over device that allows for the discovery of radio devices using different wireless communication technologies. Referring again to FIG. 1, in one embodiment, discovery logic 110 is configured to cooperate with communication logic 140 to discover radio devices operating within a same radio band within a same region using NAN technology. At least one of the radio devices (e.g., radio device 100 of FIG. 1 or multi-radio device 350 of FIG. 3) operates based on two or more different wireless communication technologies (e.g., Wi-Fi, Bluetooth, LTE).

For example, Referring to FIG. 3, in one embodiment, discovery logic 110 of radio device 100, in cooperation with communication logic 140, may communicate with radio device 310, radio device 340, and multi-radio device 350 via Wi-Fi wireless communication technology employing NAN technology. The communications allow the Wi-Fi radio device 100 to discover the Wi-Fi radio devices 310, 340, and 350 via direct communication. Multi-radio device 350 may also be in direct communication, via Bluetooth and LTE, with radio device 320 and radio device 330, respectively. Therefore, multi-radio device 350 can communicate back to radio device 100 via Wi-Fi that the radio devices 320 and 330 are also present in the same radio frequency band within the same region. In this manner, radio device 100 indirectly discovers radio devices 320 and 330, even though radio devices 320 and 330 are operating using different wireless communication technologies than radio device 100.

In one embodiment, discovery may be accomplished by discovery logic 110 of radio device 100 generating a beacon discovery window signal which is periodically transmitted via Wi-Fi in cooperation with communication logic 140. Another radio device (e.g., Wi-Fi station device 340) may receive the beacon discovery window signal and respond (transmit back) to the radio device 100 to identify itself (and possibly identify other radio devices that it knows about as well). In other embodiments, the other radio device may be configured to identify itself (as well as possibly other "known" radio devices in the region) via a broadcast message, without any prompting from the radio device 100 of FIG. 1, thus allowing the radio device 100 of FIG. 1 to discover the other radio device(s) in a sharing manner.

Referring again to FIG. 2, at 220, the multiple radio devices are synchronized with respect to a master clock reference generated by one of the multiple radio devices. For example, in FIG. 3, radio device 100 performs the synchronization. Synchronization of the Wi-Fi radio devices is performed using NAN synchronization techniques which communicate synchronization information. However, synchronization of the non-Wi-Fi radio devices is performed by crossing over the NAN synchronization techniques from Wi-Fi to Bluetooth (radio device 350 to radio device 320) and from Wi-Fi to LTE (radio device 350 to radio device 330). For example, referring again to FIG. 1, once another radio device (e.g., Bluetooth device 320) is discovered by the radio device 100 of FIG. 1, synchronization logic 120, in cooperation with communication logic 140, can temporally synchronize (i.e., synchronize in time) the other radio device (e.g., Bluetooth device 320) with respect to the master clock reference. The synchronization is accomplished by using radio device 350 to cross over from Wi-Fi to another wireless communication technology (e.g., Bluetooth) to communicate the synchronization information.

Synchronization information may be received by the other radio devices via, for example, a beacon frame or some other management frame. The synchronization information may specify timing associated with transmission time slots. For example, a time stamp (a type of synchronization information) associated with the master clock reference may be communicated from the radio device 100 to the other radio device via beacon signaling techniques, in accordance with one embodiment. That is, in one embodiment, the time stamp associated with the master clock reference may be tied to a time of transmission of a beacon discovery window transmitted by the radio device 100 in a beacon frame which can be received by the other radio device. In this manner, the other radio device can use the time stamp information to synchronize its internal clock to the master clock reference. In one embodiment, synchronizing logic 120 of radio device 100 generates the master clock reference. In another embodiment, the master clock reference is generated by some other radio device (e.g., multi-radio device 350) and is communicated to radio device 100.

Referring again to FIG. 2, at 230, transmission time slots are allocated among the multiple radio devices, based on the discovering and the synchronizing, ensuring that radio transmissions by each radio device occurs at a different time. For example, referring again to FIG. 1, once another radio device (e.g., Bluetooth device 320) is synchronized to the master clock reference, time slot allocation logic 130 of the radio device 100 of FIG. 1 can allocate one or more time slots to the other radio device. The allocated time slots may occur between every two successive beacon discovery window signals that are transmitted by the radio device 100, in accordance with one embodiment (see FIG. 4). The allocated time slots define segments of time (with respect to the master clock reference) during which the other radio device is allowed to transmit within the radio frequency band.

The time slots are allocated by time slot allocation logic 130 such that another radio device will not transmit at the same time as any other radio device (including the radio device 100 of FIG. 1). Information associated with the allocated time slots can be transmitted to another radio device from the radio device 100 in a beacon message via communication logic 140, for example. In this manner, the other radio device, having allocated time slots, "knows" when to transmit and when not to transmit to avoid interfering with any other radio device operating within the same band.

In one embodiment, time slot allocation performed by one radio device may be influenced by another radio device. For example, referring to FIG. 3, after synchronization to the master clock reference, the Bluetooth radio device 320 may communicate transmission time information to the multi-radio device 350. The transmission time information may indicate in which time slots, with respect to the master clock reference, that the Bluetooth radio device 320 prefers to operate or has already been operating. This transmission time information can be passed on to the radio device 100 from the multi-radio device 350 via Wi-Fi. The radio device 100 can use the transmission time information to allocate transmission time slots to the Bluetooth radio device 320. For example, the radio device 100 may simply adopt the time slots indicated by the Bluetooth radio device 320, or may allocate similar or totally different time slots.

Figure 4:
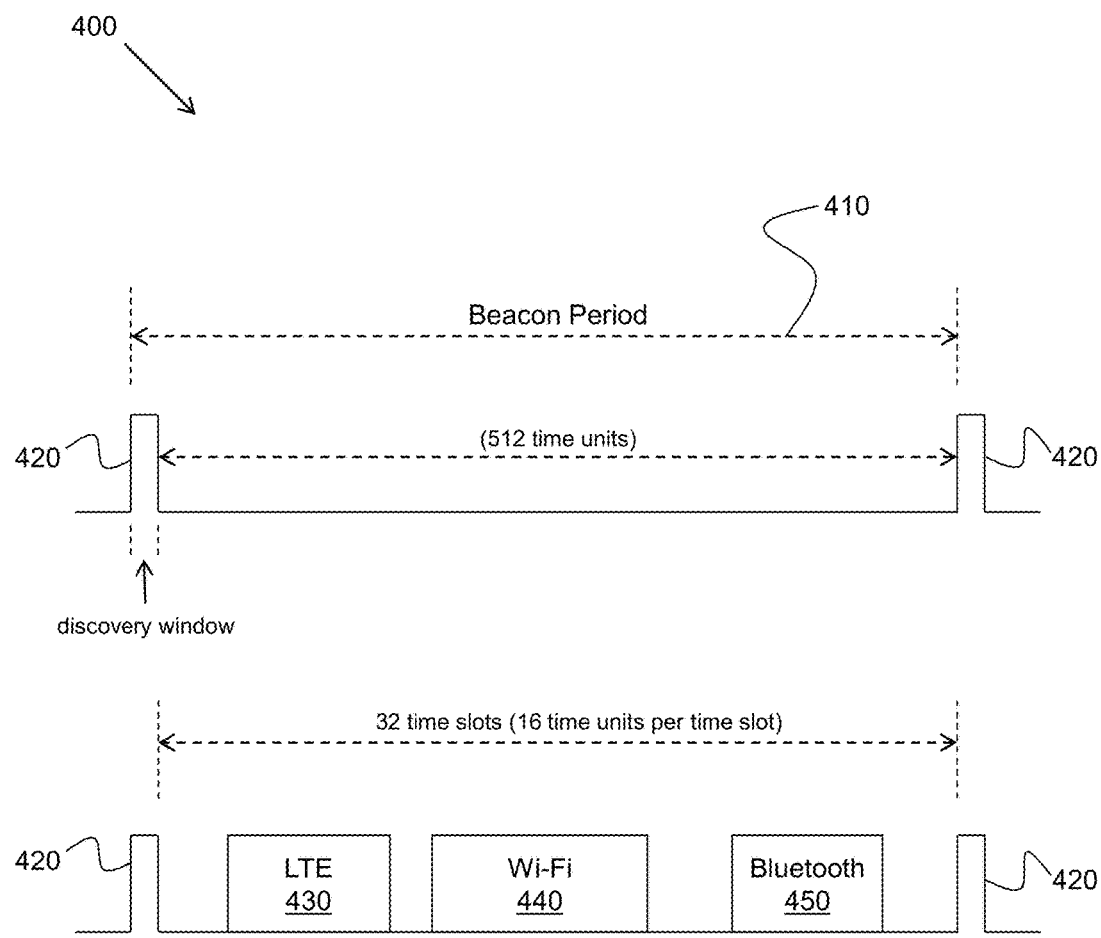
FIG. 4 illustrates a diagram showing transmission time slots allocated over a beacon period, in accordance with the method of FIG. 2, to allow for the coexistence of the radio devices in the communication environment of FIG. 3.

FIG. 4 illustrates a diagram 400 showing one embodiment of transmission time slots allocated over a beacon period 410, in accordance with the method 200 of FIG. 2, to allow for the coexistence of the radio devices in the communication environment 300 of FIG. 3. As seen in FIG. 4, a beacon discovery window signal 420 is transmitted for every beacon period 410. Each beacon period 410 includes 512 time units (TU's) which are broken up into 32 transmission time slots (i.e., 16 TU's per time slot). As seen in FIG. 4, a first set of time slots 430 has been allocated as LTE time slots which are divided between the LTE device 330 and the multi-radio device 350 (LTE transmissions) of FIG. 3. A second set of time slots 440 has been allocated as Wi-Fi time slots which are divided between radio device 100, Wi-Fi AP device 310, Wi-Fi station device 340, and multi-radio device 350 (Wi-Fi transmissions) of FIG. 3. A third set of time slots 450 has been allocated as Bluetooth time slots which are divided between Bluetooth device 320 and multi-radio device 350 (Bluetooth transmissions).

In general, the radio device 100 of FIG. 1 is configured to discover, synchronize, and allocate transmission time slots for each radio device operating within the same radio frequency band within the same geographic region. In this manner, all radio devices operating within the same radio frequency band within the same geographic region will be prevented from interfering with each other. Even though different radio devices may operate within the same radio frequency band using different wireless communication technologies, the radio device 100 of FIG. 1 is capable of discovering, synchronizing, and allocating transmission time slots to all the radio devices when configured as a multi-radio device, or when communicating with a multi-radio device. For example, when the radio device 100 is not configured as a multi-radio device (i.e., not using multiple wireless communication technologies), the radio device 100 relies on other multi-radio devices to cross over to the radio devices that operate using a different wireless communication technology. In this manner, the radio device 100 may act like a central controller that dictates to all other radio devices within the region with respect to transmission time slot allocation.

In other embodiments, a distributed model can be employed. In a distributed model, each radio device operating within a same radio frequency band within a same region senses (discovers) other radio devices, and determines the time slots in which it can transmit to avoid the other radio devices. In such a distributed model, synchronization to a master clock reference may or may not occur. For example, a particular radio device may simply keep track of the times of transmission of other radio devices with respect to its own internal clock reference which, by default, would effectively become the master clock reference for that particular radio device. In such an embodiment, however, the particular radio device may have to continuously monitor the radio frequency band for transmissions of other radio devices with respect to its internal clock reference. This can create a significant amount of operational overhead for the particular radio device.

In still other embodiments, a shared model can be employed. In one embodiment of a shared model, a single multi-radio device can sense all the time slot traffic within a radio frequency band within a region. The multi-radio device can send out masks of available time slots to the other radio devices (e.g., via beacon messages), thus sharing knowledge of the radio environment. The other radio devices can decide for themselves which available time slots to use. The single multi-radio device may be configured to update the time slot masks as other radio devices enter and leave the environment.

In another embodiment of a shared model, various radio devices operating within a same radio frequency band within a region can collect and share knowledge with each other concerning times of transmission with respect to a master clock reference. Synchronization to the master clock reference may be initiated by a single radio device, for example. The various radio devices may each have similar or different capabilities with respect to discovering other radio devices using various wireless communication technologies. For example, one radio device may be capable of discovering Bluetooth radio devices. Another radio device may be capable of discovering Wi-Fi and LTE radio devices. Still another radio device may be capable of discovering LAA radio devices. The various radio devices can share the discovery information (times of transmission with respect to the master clock reference) with each other through, for example, beacon messaging techniques. Again, each radio device, can then determine which available time slots to use. In this way, no one radio device is responsible for discovering all other radio devices within the radio frequency band within the region.

Integrated Circuit Device Embodiment

FIG. 5 illustrates one example embodiment of the radio device 100 of FIG. 1 implemented as an integrated circuit device 500. In this embodiment, the discovery logic 110, the synchronizing logic 120, the time slot allocation logic 130, and the communication logic 140 are each embodied as a separate integrated circuit 510, 520, 530, and 540, respectively.

The circuits are connected via connection paths to communicate signals. While integrated circuits 510, 520, 530, and 540 are illustrated as separate integrated circuits, they may be integrated into a common integrated circuit device 500. Additionally, integrated circuits 510, 520, 530, and 540 may be combined into fewer integrated circuits or divided into more integrated circuits than illustrated.

In another embodiment, the discovery logic 110, the synchronizing logic 120, the time slot allocation logic 130, and the communication logic 140 (which are illustrated in integrated circuits 510, 520, 530, and 540, respectively) may be combined into a separate application-specific integrated circuit. In other embodiments, portions of the functionality associated with the discovery logic 110, the synchronizing logic 120, the time slot allocation logic 130, and the communication logic 140 may be embodied as firmware (a read-only memory or other non-volatile memory with microcode) executable by a processor to perform the described functions.

IEEE 802.11 Embodiment

Figure 6:
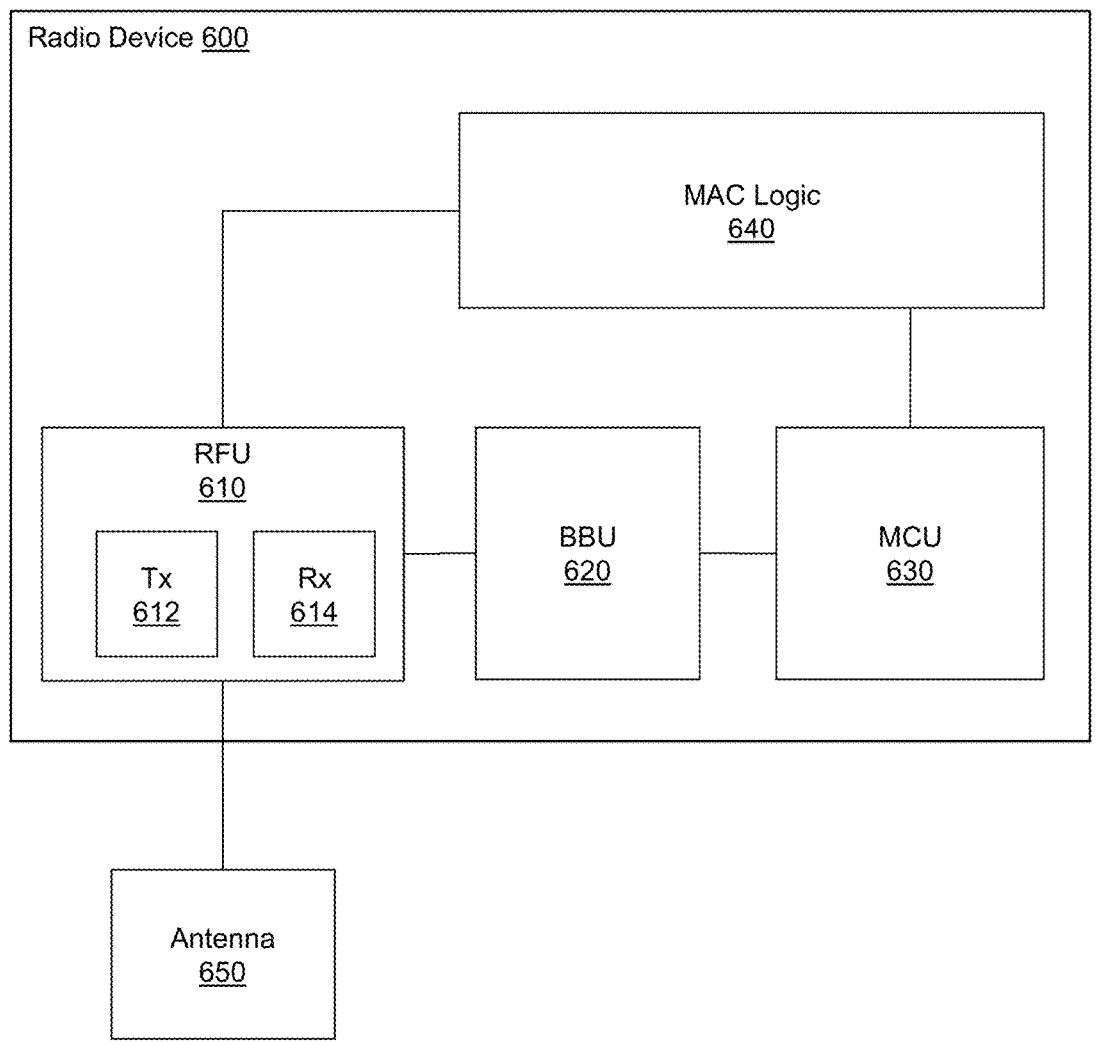
FIG. 6 illustrates a second example embodiment of a radio device configured to support the coexistence of multiple radio devices that use multiple wireless communication technologies in a same radio frequency band in a same region.

FIG. 6 illustrates a second example embodiment of a radio device 600 configured to support the coexistence of multiple radio devices that use multiple wireless communication technologies in a same radio frequency band in a same region. In one embodiment, the radio device 600 is a wireless mobile device. The radio device 600 includes a radio frequency unit (RFU) 610, a baseband unit (BBU) 620 and a media access control (MAC) hardware unit (MCU) 630. The radio frequency unit 610 is operably connected to an antenna(s) 650. The radio frequency unit 610 includes both a receive (Rx) circuit 614 and a transmit (Tx) circuit 612.

In one embodiment, the transmit circuit 612 is configured to transmit radio frequency signals to the antenna 650, and the receive circuit 614 is configured to receive radio frequency signals from the antenna 650. The baseband unit 620 is configured to analyze radio frequency signals received by the radio frequency unit 610, and to provide received information to the MCU 630. The MCU 630 is configured to work in cooperation with the baseband unit 620 to provide information to MAC logic 640. MAC logic 640 is configured to perform the functionality of various modes of operation and control the radio frequency unit in accordance with a current mode of operation (e.g. a discovery mode of operation, a synchronizing mode of operation, or a time slot allocation mode of operation).

In the embodiment of FIG. 6, the functions of the logics of FIG. 1 (discovery logic 110, synchronizing logic 120, time slot allocation logic 130, and communication logic 140) are distributed among the elements of the radio device 600. For example, in one embodiment, the functionality of time slot allocation logic 130 may be implemented in MAC logic 640. The functionality of synchronizing logic 120 may be collectively supported by all of the elements of the apparatus 600, and the antenna 650.

The MAC hardware unit 630 and the radio frequency unit 610 are configured to communicate with MAC logic 640. MAC logic 640 is configured to receive a master clock reference from the MAC hardware unit 630 and provide a control message and a synchronizing message to the radio frequency unit 610. The control message puts the RFU 610 in a transmitting mode of operation. The synchronizing message is transmitted by the radio frequency unit 610 in a neighbor awareness networking mode of operation to synchronize other radio devices, operating within the same radio frequency band in a same geographic region, to the master clock reference.

The control message can control the Rx block 614 and the Tx block 612 collectively and/or individually, in accordance with various embodiments. While control of transmitting during a neighbor awareness networking operation is described, MAC logic 640 can control the radio frequency unit 610 to operate in other modes that use various combinations of transmit and receive protocols (e.g., a network association mode that performs functions to establish an association with a wireless access point device).

In different embodiments, MAC logic 640 can be, but is not limited to, hardware, firmware, instructions in execution on a machine, and/or combinations thereof to perform a function(s) or an action(s), and/or to cause a function or action from another logic, method, apparatus, and/or system. MAC logic 640 may include a software controlled microprocessor, a discrete logic (e.g., ASIC), an analog circuit, a digital circuit, a programmed logic device, a memory device containing instructions, and so on. MAC logic 640 may include one or more gates, combinations of gates, or other circuit components. Other "logics" described herein may take forms similar to those described in connection with MAC logic 640.

Systems, methods, and other embodiments associated with providing communication coexistence among different radio technologies via synchronization and time slot allocation have been described. According to one embodiment, a first radio device includes discovery logic, synchronizing logic, time slot allocation logic, and communication logic configured to perform a method. The method includes discovering a plurality of radio devices operating within a same radio band within a same geographic region. The plurality of radio devices includes the first radio device. Furthermore, at least one radio device of the plurality of radio devices operates based on at least two different wireless communication technologies. The method also includes temporally synchronizing the plurality of radio devices with respect to a master clock reference generated by one of the plurality of radio devices. The method further includes allocating at least one time slot of a plurality of transmission time slots to at least one radio device of the plurality of radio devices based on the discovering and the synchronizing. The allocating of the at least one time slot ensures that radio transmissions by the at least one radio device do not occur at a same time as radio transmissions by other radio devices of the plurality of radio devices.

Definitions and Other Embodiments

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

What is claimed is:

1. A first radio device comprising:
   communication logic configured to transmit and receive radio signals in accordance with at least one wireless communication technology;
   discovery logic configured to, in cooperation with the communication logic, discover a plurality of radio devices operating within a same radio band within a same geographic region as the first radio device based on a discovery window signal, wherein at least one radio device of the plurality of radio devices operates based on at least two different wireless communication technologies; and
   synchronization logic configured to, in cooperation with the communication logic, send a beacon frame to each of the plurality of radio devices operating within the geographic region, wherein the beacon frame comprises synchronization information configured to temporally synchronize a clock of each of the first radio device and the plurality of radio devices, and wherein the synchronization information comprises:
      i) a master start time for synchronizing a clock of the first radio device and the clock of each of the plurality of radio devices, and
      ii) time slot information describing a transmission time slot for the first radio device and each of the plurality of radio devices to transmit, while operating in the geographic region, information relative to the master start time; and
   time slot allocation logic configured to, in cooperation with the communication logic, receive transmission time information from a second radio device of the plurality of radio devices, wherein the transmission time information indicates a preferred time slot for the second radio device, and wherein the time slot allocation logic is configured to allocate a plurality of the transmission time slots among the first radio device and the plurality of radio devices based on discovering the plurality of radio devices and based on the transmission time information to generate the time slot information.

2. The first radio device of claim 1, wherein allocating the plurality of transmission time slots ensures that radio transmissions by the first radio device and by each radio device of the plurality of radio devices occurs at a different time.

3. The first radio device of claim 1, wherein the first radio device is a Wi-Fi device configured in accordance with a Wi-Fi neighbor awareness networking technical specification.

4. The first radio device of claim 1, wherein the discovery logic is configured to, in cooperation with the communication logic, send a beacon to each of the plurality of radio devices and detect responses, generated in response to the beacon, from each of the plurality of radio devices to discover the plurality of radio devices operating within the same radio band within the same geographic region.

5. The first radio device of claim 1, wherein the transmission time information further indicates a time slot in which the second radio device is operating.

6. The first radio device of claim 1, wherein the at least one wireless communication technology includes at least one of Wi-Fi, Bluetooth, Long-Term Evolution, Long-Term Evolution Unlicensed, or Licensed Assisted Access.

7. The first radio device of claim 1, wherein the at least two different wireless communication technologies include at least two of Wi-Fi, Bluetooth, Long-Term Evolution, Long-Term Evolution Unlicensed, or Licensed Assisted Access.

8. The first radio device of claim 1, wherein the first radio device is configured as an access point device.

9. The first radio device of claim 1, wherein the first radio device is configured as a station device.

10. A method performable by a first radio device, the method comprising:
   discovering a plurality of radio devices operating within a same radio band within a same geographic region as the first radio device, wherein at least one radio device of the plurality of radio devices operates based on at least two different wireless communication technologies; and wherein the discovering comprises receiving transmission time information from a second radio device of the plurality of radio devices, wherein the transmission time information indicates a preferred time slot for the second radio device;
   allocating a plurality of transmission time slots among the first radio device and each of the plurality of radio devices based on the discovering to generate time slot information, wherein the allocating comprises allocating the plurality of transmission time slots among the first radio device and each of the plurality of radio devices based on the transmission time information to generate the time slot information; and wherein the allocating ensures that radio transmissions by the first radio device and by each radio device of the plurality of radio devices occurs at a different time; and sending a beacon frame to each of the plurality of radio devices operating within the geographic region, wherein the beacon frame comprises synchronization information, and wherein the synchronization information comprises:
  i) a master start time for synchronizing a clock of the first radio device and a clock of each of the plurality of radio devices, and
  ii) the time slot information, wherein the time slot information describes, from among the plurality of transmission time slots, a transmission time slot for the first radio device and for each of the plurality of radio devices to transmit, while operating in the geographic region, information relative to the master start time.

11. The method of claim 10, wherein the transmission time information further indicates a time slot in which the second radio device is operating.

12. The method of claim 10, wherein the discovering comprises:
  sending a beacon to each of the plurality of radio devices; and
  detecting responses, generated in response to the beacon, from each of the plurality of radio devices.

13. The method of claim 10, wherein the first radio device is a Wi-Fi device configured in accordance with a Wi-Fi neighbor awareness networking technical specification.

14. The method of claim 10, wherein the synchronization information further comprises channel information describing a communication channel through which each of the plurality of radio devices is to transmit information.

15. The method of claim 10, wherein the at least two different wireless communication technologies include at least two of Wi-Fi, Bluetooth, Long-Term Evolution, Long-Term Evolution Unlicensed, or Licensed Assisted Access.

16. A non-transitory computer-readable medium storing instructions that, when executed by one or more processors of a computing device, cause the computing device to at least:
  transmit and receive radio signals in accordance with at least one wireless communication technology;
  discover a plurality of radio devices operating within a same radio band within a same geographic region, wherein at least one radio device of the plurality of radio devices operates based on at least two different wireless communication technologies; and wherein the discovering comprises receiving transmission time information from a first radio device of the plurality of radio devices, wherein the transmission time information indicates at least one of a preferred time slot for the first radio device;
  allocate a plurality of the transmission time slots among the plurality of radio devices based on the transmission time information to generate the time slot information, wherein allocating the plurality of transmission time slots ensures that radio transmissions by each radio device of the plurality of radio devices occurs at a different time; and
  send a beacon frame to each of the plurality of radio devices operating within the geographic region, wherein the beacon frame comprises synchronization information, and wherein the synchronization information comprises:
    i) a master start time for synchronizing a clock of the plurality of radio devices, and
    ii) time slot information describing a transmission time slot for each of the plurality of radio devices to transmit, while operating in the geographic region, information relative to the master start time.

17. The non-transitory computer-readable medium of claim 16, wherein the instructions further comprise instructions that when executed by the one or more processors cause the computing device to allocate the plurality of transmission time slots among the plurality of radio devices based on discovering the plurality of radio devices to generate the time slot information.

18. The non-transitory computer-readable medium of claim 16, wherein the transmission time information further indicates a time slot in which the first radio device is operating.

19. The non-transitory computer-readable medium of claim 16, wherein the instructions further comprise instructions that when executed by the one or more processors cause the computing device to configure a Wi-Fi device in accordance with a Wi-Fi neighbor awareness networking technical specification.

20. The non-transitory computer-readable medium of claim 16, wherein the instructions further comprise instructions that when executed by the one or more processors cause the computing device to:
  sending a beacon associated with a discovery window to each of the plurality of radio devices; and
  detect responses, generated in response to the beacon, from each of the plurality of radio devices to discover the plurality of radio devices operating within the same radio band within the same geographic region.

21. The first radio device of claim 1, wherein discovery logic is further configured to, in cooperation with the communication logic, discover the plurality of radio devices based on a beacon signal; wherein the time slot information further describes sets of contiguous transmission time slots located between successive beacon signals; wherein each set is assigned to a unique wireless communication technology; and wherein each set facilitates transmission by only radio devices which operate with the unique wireless communication technology.

22. The method of claim 10, wherein discovering the plurality of radio devices comprises discovering the plurality of radio devices based on a beacon signal; wherein the time slot information further describes, sets of contiguous transmission time slots located between successive beacon signals; wherein each set is assigned to a unique wireless communication technology; and wherein each set facilitates transmission by only radio devices which operate with the unique wireless communication technology.

23. The non-transitory computer-readable medium of 16, wherein the instructions to discover the plurality of radio devices comprises instructions to discover the plurality of radio devices based on a beacon signal; wherein the time slot information further describes sets of contiguous transmission time slots located between successive beacon signals; wherein each set is assigned to a unique wireless communication technology; and wherein each set facilitates transmission by only radio devices which operate with the unique wireless communication technology.

\* \* \* \* \*